United States Patent [19]

Childers et al.

[11] Patent Number: 5,473,774

[45] Date of Patent: Dec. 5, 1995

[54] METHOD FOR CONFLICT DETECTION IN PARALLEL PROCESSING SYSTEM

[75] Inventors: Jimmie D. Childers, Missouri City, Tex.; Hajime Karasawa, Sagamihara, Japan

[73] Assignee: Texas Instruments Incorporated, Dallas, Tex.

[21] Appl. No.: 427,185

[22] Filed: Apr. 21, 1995

Related U.S. Application Data

[63] Continuation of Ser. No. 72,251, Jun. 3, 1993, abandoned, which is a continuation of Ser. No. 494,645, Mar. 15, 1990, abandoned.

[51] Int. Cl.$^6$ .................................................... G06F 9/38
[52] U.S. Cl. .................. 395/650; 364/281.4; 364/DIG. 1
[58] Field of Search ...................................... 395/650, 700

[56] References Cited

U.S. PATENT DOCUMENTS 5,073,855  12/1991  Staplin et al. .................... 395/375
5,115,499  5/1992  Stiffler et al. ..................... 395/425

Primary Examiner—Kevin A. Kriess
Assistant Examiner—John Q. Chavis
Attorney, Agent, or Firm—Gerald E. Laws; C. Alan McClure; James F. Hollander

[57] ABSTRACT

A method of using a computer to assemble source code having a number of sub-instructions on each source code line, such that a processor may execute more than one sub-instruction during a single clock cycle. The computer is used to assign a binary conflict mask to each sub-instruction and to compare these conflict masks to determine whether a conflict exists among the sub-instructions. Additional features of the invention are determining the nature of the conflict and generating an appropriate indication signal to the user.

14 Claims, 7 Drawing Sheets

| | SI(1) | SI(2) | SI(3) | SI(4) | SI(5) | SI(6) | SI(7) |
|---|---|---|---|---|---|---|---|
| SI(1) | — | AND | AND | AND | AND | AND | AND |
| SI(2) | — | — | AND | AND | AND | AND | AND |
| SI(3) | — | — | — | AND | AND | AND | AND |
| SI(4) | — | — | — | — | AND | AND | AND |
| SI(5) | — | — | — | — | — | AND | AND |
| SI(6) | — | — | — | — | — | — | AND |
| SI(7) | — | — | — | — | — | — | — |

| Two Octal Conflict Masks AND'ed Together | Two Octal Op-Codes XOR'ed Together | Reg File Addresses XOR'ed Together R1 15 | R0 12 | Applicable Warning/Error Message |
|---|---|---|---|---|
| ═TEST 1═ | | | | |
| 00000000 | | | | NC: Bypass all other tests |
| non-zero | | | | WRN or ERR: continue with TEST 2 |
| ─TEST 2─ | | | | |
| 1xxxxxxx | 1xxxxxxx | | | ERR: Conflicting states for CIF |
| 1xxxxxxx | 0xxxxxxx | | | WRN: M directing multiple paths |
| ─TEST 3─ | | | | |
| xHxxxxxx | | | | ERR: Multiple sources for WR M |
| xxHxxxxx | | | | ERR: Multiple sources for WR A |
| xxxHxxxx | | | | ERR: Multiple sources for WR B |
| xxxxHxxx | | | | ERR: Multiple sources for WR C |
| xxxxxHxx | | | | ERR: Multiple sources for L/R |
| ─TEST 4─ | | | | |
| xxxxxxx (1xx) | xxxxxxx (1xx) | | x | ERR: Both R0 and DIR specified |
| xxxxxxx (1xx) | xxxxxxx (0xx) | | H | ERR: Multiple addresses specified for R0 or DIR |
| xxxxxxx (1xx) | xxxxxxx (0xx) | | 0 | NC |
| ─TEST 5─ | | | | |
| xxxxx (1xx) x | xxxxx (1xx) x | x | | ERR: Both R0 and DIR specified |
| xxxxx (1xx) x | xxxxx (0xx) x | H | | ERR: Multiple addresses specified for R0 or DIR |
| xxxxx (1xx) x | xxxxx (0xx) x | 0 | | NC |
| ─TEST 6─ | | | | |
| xxxxxxx (xSS) | | | | ERR: Multiple sources for R0 |
| xxxxx (xSS) x | | | | ERR: Multiple sources for R1 |

Figure 6

METHOD FOR CONFLICT DETECTION IN PARALLEL PROCESSING SYSTEM

This application is a Continuation of application Ser. No. 08/072,251, filed Jun. 3, 1993, now abandoned. This application is also a Continuation of application Ser. No. 07/494,645, filed on Mar. 15, 1990 in the United States is claimed under 35 U.S.C. 119, and is now abandoned.

TECHNICAL FIELD OF THE INVENTION

This invention relates to computer processing, and more particularly to an instruction set architecture having multiple sub-instructions, which are to be executed during a single processor clock cycle.

BACKGROUND OF THE INVENTION

Computer assemblers are programs that enable programmers to write machine level programs, and do so by converting source programs written with instruction mnemonics into machine code. Typically, an assembler operates on source codes in which each line contains an instruction, an assembler directive, a comment, or a macro directive.

The execution of an instruction is called the fetch-execute cycle, and is composed of a sequence of micro-instructions. As opposed to instructions, which are stored in primary memory, micro-instructions are usually stored in a control memory. A micro-instruction is a collection of data transfer orders that are simultaneously executed. The data transfers that result from these orders are movements of, and operations on, words of data as these words are moved around in the machine. Micro-instructions are grouped as a function of data path cycles, which are fixed times when the memory fetches an instruction, memorizes or recalls a data word, or is idle. A clock beats out time signals, one clock pulse per data path cycle. The processor's fetch-execute cycle is thus a period of data path cycles.

Recent innovations in processor architecture have attempted to improve the efficiency of traditional architecture described above. One recent innovation is the reduced instruction set computer (RISC). These computers are programmed with instructions that are executed in a single data path cycle.

However, existing architectures are constrained to the assumption that no more than one instruction is executed per data path cycle. A need exists for a new approach to processor design that is not confined to this assumption.

SUMMARY OF THE INVENTION

A first method aspect of the invention is a method of using a computer to assemble source code comprising of a number of sub-instructions on each source code line, such that a processor may execute more than one sub-instruction during a single clock cycle. The computer is used to assign a binary conflict mask to each sub-instruction and to compare these conflict masks to determine whether a conflict exists among the sub-instructions. Additional features of the invention are determining the nature of the conflict and generating an appropriate indication signal to the user.

A second method aspect of the invention is a method of programming a computer to detect conflicts among sub-instructions that are to be executed during a single clock cycle of a processor. The programmer first determines a set of rules that specify the conditions in which conflicts will exist. The programmer then assigns a binary conflict mask to each of said sub-instructions in accordance with these rules. The programmer then programs the computer so that it will receive a proposed computer program and compare the conflict masks to determine whether a conflict exists.

An apparatus aspect of the invention is a processor system for executing multiple sub-instructions during a single processor clock cycle. A single-instruction multiple-data processor has a number of processing elements, each processing element having the following components: a data input register, two register files, an arithmetic unit with working registers, and a data output register. The processor is in communication with an instruction generator programmed to recognize a set of sub-instructions. Each sub-instruction is associated with one of the processor components as a destination, and the sub-instructions are assembled according to a set of rules for avoiding conflicts among them.

A technical advantage of the invention is that it provides a different approach to designing processor instruction sets, based on the premise that processor resources may be shared and concurrently perform certain operations. This permits multiple sub-instructions to be executed during a single processor clock cycle.

BRIEF DESCRIPTION OF THE DRAWINGS

FIG. 6 illustrates the steps of determining the nature of a conflict among sub-instructions.

DETAILED DESCRIPTION OF THE INVENTION

Related Applications

This application is related to U.S. patent applications Ser. No. 119,890 (TI-13116), filed Nov. 13, 1987; Ser. No. 435,862 (TI-13116A); Ser. No. 119,889 (TI-13117); Ser. No. 256,150 (TI-13117A), filed Nov. 13, 1987; Ser. No. 323,045 (TI-13117B), and Ser. No. 402,975 (TI-13117C). These applications have a corresponding European Patent Application No. 0 317 218, filed Nov. 11, 1988, and published May 24, 1989.

This application is also related to U.S. Ser. No. 421,499 (TI-13496), which was filed in the United States on Oct. 13, 1989. These applications are assigned to Applicant's assignee and the contents of these applications are hereby incorporated herein by reference.

Serial Video Processor

Figure 1:
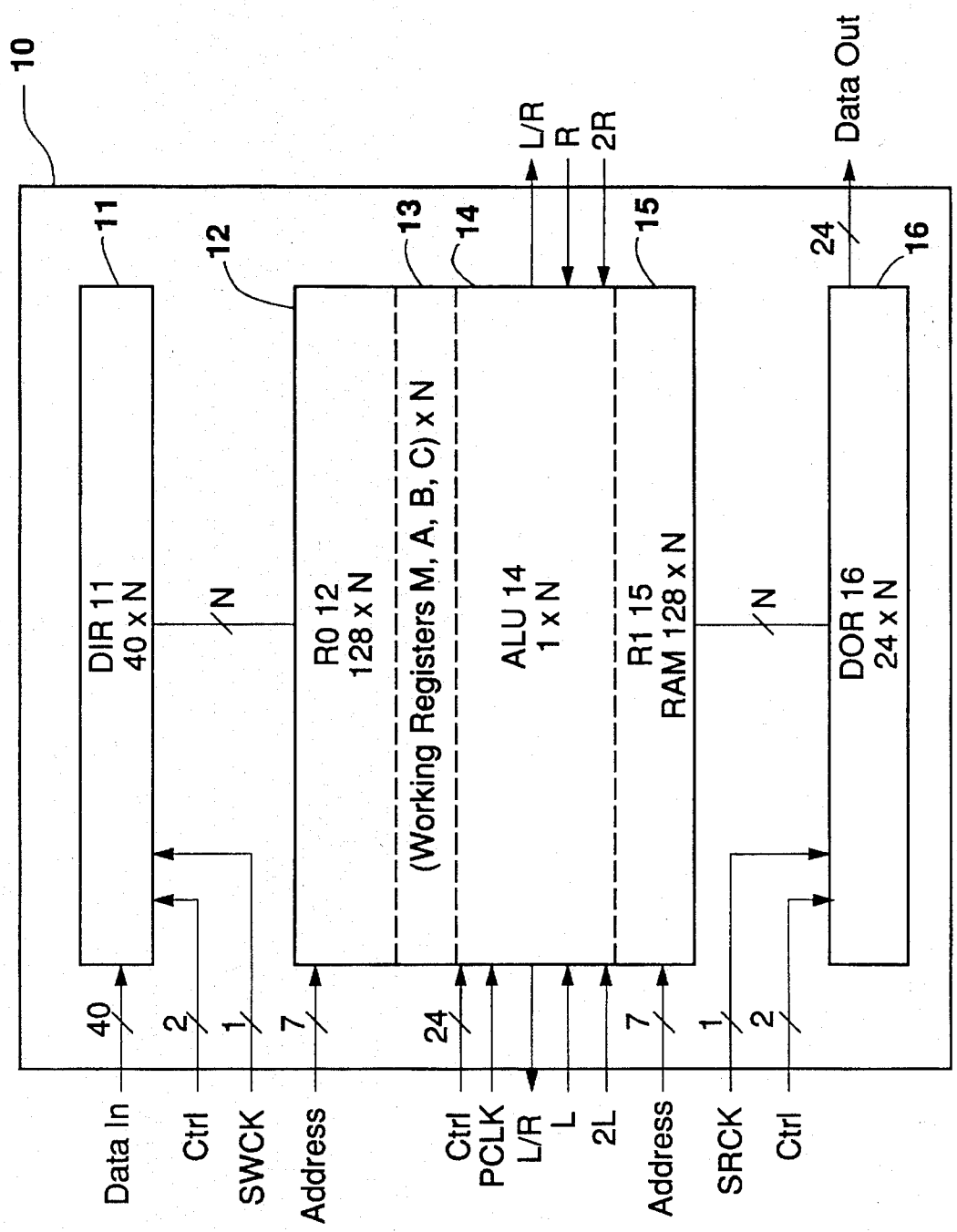
FIG. 1 is a block diagram of a serial video processor.

FIG. 1 illustrates an example of a serial video processor (SVP) 10, which may also be described as a synchronous vector processor (also SVP). The SVP 10 of FIG. 1 is the subject of the copending patent applications cited above. Subsequent sections of this application are directed to devices and processes that use SVP 10. However, these devices and processes are not necessarily limited to use with this particular SVP 10, and variations of SVP 10 may be used.

The "serial video" aspects of SVP 10 derive from the fact that it is particularly suited for video processing, where discrete packets of incoming data, which have a uniform size, are input and output in a word-serial manner but are processed in parallel. The "synchronous vector" aspects of SVP 10 derive from the fact that it receives and processes data vectors in synchronization with a real time data source. Essentially, SVP 10 operates by using fine-grained parallelism techniques in which many processing elements operate on the data concurrently.

SVP 10 is a general purpose, mask-programmable, single instruction multiple data (SIMD), reduced instruction set computing (RISC) device. Consistent with the SIMD characteristic, SVP 10 has a number of processing elements (PE's), which execute the same instruction at the same time. External microinstructions control primitive logic and arithmetic functions for each clock cycle.

Figure 2:
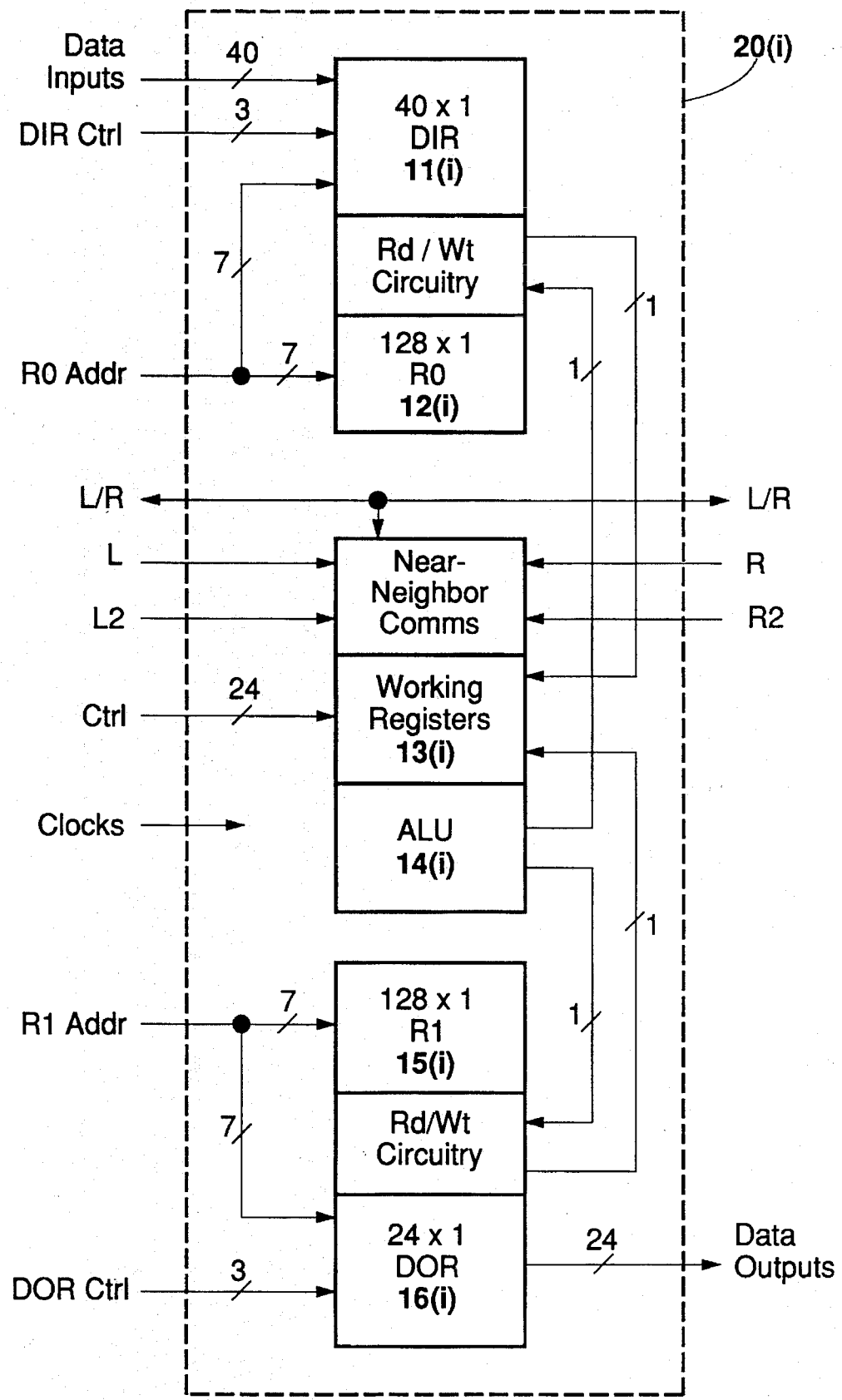
FIG. 2 is a block diagram of a single processing element of the processor of FIG. 1.

Referring to FIGS. 1 and 2, SVP 10 is a one-dimensional array of one-bit PE's 20. Each PE 20 has the following basic components: a data input register (DIR) 11, two independently addressed register files (R0 and R1) 12 and 15, a set of working registers (WR's) 13, a one bit arithmetic unit (ALU) 14, and a data output register (DOR) 16. These are described briefly in this section, and reference to the related patents cited above will provide further description, especially with regard to instructions and timing.

DIR 11 can be thought of as the "input layer". R0 12 and R1 15, the WR's 13, and the ALU 14 are the "computational layer". DOR 16 is the "output layer". Although each layer may be independently clocked across each layer, all PE's 20 operate in unison, every clock cycle. The input to DIR 11 is word-serial in the sense that words of an incoming packet of data are received into DIR 11 word by word. Similarly, the output from DIR 16 is word-serial.

Although input and output are word-serial, processing of each data packet is parallel. Also, because of the "layered" approach to processing, data input, computation, and data output may be concurrent operations, with each being independently clocked. Each PE 20 performs these operations on an entire vector of data at once, and is thus a "pipeline" that enables several operations to be in various stages at once. When a vector instruction is executed, the elements of the vector are fed into the appropriate pipeline one at a time, delayed by the time it takes to complete one stage of the pipeline. Input and output are in synchronization with the data source, such as a video camera, and with the data sink, such as a raster scan display.

For purposes of illustration, SVP 10 has N number of PE's 20, where N=698. The memory size is 256 bits for each PE 20, with 128 bits each for R0 and R1, DIR 11 is 40 bits wide and DOR 16 is 24 bits wide. These sizes are discretionary, however, and may be changed without changing the substance of the invention. The input and output bit sizes are included in FIGS. 1 and 2 to illustrate various input/output and device size relationships. However, these bit sizes may be varied according to the application.

Using these values, a single SVP 10 can process data packets of 1 to 698 words by 40 bits. Typically, the packets are equal in size and represent periodically recurring data, such as lines of a television image, where each packet is digitized into N number of data samples, and where each sample, $S(i)$, $i=1 \ldots N$, is a data word used to generate an output word. In television applications, where SVP 10 has N PE's 20, N also represents the number of data samples per line.

FIG. 2 illustrates a single PE 20($i$) and its associated components, where $i=1 \ldots 698$. A vertical slice through SVP 10 of FIG. 1 yields an individual PE 20 of FIG. 2, thus each PE 20($i$) and its components are referred to herein as a "column" with respect to the entire array of SVP 10.

DIR 11 and DOR 16 are the basic I/O devices of SVP 10. Both DIR 11 and DOR 16 are arrays of sequentially addressed, dual-ported memory cells. As used in this description, "DIR 11" refers to the entire array, and "DIR 11($i$)" refers to the column of DIR 11 that receives data sample S(i).

Referring to both FIGS. 1 and 2, the input array size to SVP 10 permitted by DIR 11 is 698 words×40 bits. One port of DIR 11 is organized as 698 words of 40 bits each and permits DIR 11 to be written into from a 40 bit input line in parallel. Thus, this first port of DIR 11 emulates the write port of a 698-word line memory, which permits word-serial input. The second port of DIR 11 is organized as 40 words of 698 bits each, where each bit corresponds to a PE 20($i$). This second port provides an interface between DIR 11 and PE's 20. It is physically a part of, and is mapped into, the absolute address space of R0 12. This permits the contents of DIR 11 to be addressed for selection tow rite into memory and is read in parallel.

Like DIR 11, DOR 16 is a two port device. In a manner similar to DIR 11, it provides 1-bit access to each ALU 14($i$) and 24-bit output from SVP 10. One port of DOR 16 is organized as 698 words of 24 bits each. This port functionally emulates the read port of a 698-word line memory and is used for word-serial output. The second port of DOR 16 is organized as 24 words of 698 bits each, where each bit corresponds to a PE(i). This second port couples to R1 15, and is written to in parallel.

The write and read control signals to DIR 11 and from DOR 16 are explained in detail in subsequent sections of this application, but in general, DIR 11 and DOR 16 each have a 698-bit word selection commutator, which controls loading to and reading from DIR 11 and DOR 16, respectively. Also, DIR 11 and DOR 16 each have an enable and a reset signal.

The data inputs to DIR 11 are controlled by the signals Write Enable (WE), Reset Write (RSTW), and Serial Write Clock (SWCK). WE controls both the write function and the address pointer increment function synchronously with SWCK, which is the data sample clock input. When high, RSTW resets the address pointer to the first word in DIR 11 on the next rising edge of SWCK. The control signals for DOR 16 are Read Enable (RE), Reset Read (RSTR), and Ser. Read Clock (SRCK), which operate in an analogous manner.

R0 12 and R1 15 each have 128 words by 1 bit of read/write memory per PE 20. Different addressing structures cover the R0 12 and R1 15. However, R0 12 and R1 15 share the same control and timing circuitry. R0 12 and R1 15 are comprised of random access memory (RAM) cells. If dynamic RAM cells are used, they must be refreshed, but typical digital television applications perform the refresh by operating in a faster cycle time than the required refresh period.

Each R0 12($i$) and R1 15($i$) is independently addressable, and is capable of 1-bit read-modify-write cycle such that it can be read, the data operated on by ALU 14, and the result written back to it in a single clock cycle. R0 12 and R1 15 read data at the same time, but write separately.

The working register (WR) set for each PE 20(i) comprises four registers: M, A, B, and C. These registers are referred to herein as WR 13(A), 13(B), 13(C), and 13(M). The registers are the same, except for their data sources and destinations. Each is associated with an input multiplexer for providing data to the four inputs of each ALU 14(i). The WR 13(M) register is used for division, multiplication, and logical and conditional operations. The WR 13(A), 13(B), and 13(C) registers are addend, minuend, and carry/borrow registers, respectively.

The conditional aspect of WR 13(M) is particularly important to the invention. WR 13(M) is one of two inputs of the multiplier block of ALU 14. It also connects to WR 13(C) to control a conditional carry/borrow instruction, to R0 12 to control conditional direction instructions, and to R1 15 to control a conditional carry write instruction. A conditional instruction flag is used to indicate the use of a conditional instruction. A method for avoiding conflicts among these conditional instructions is explained below.

ALU 14 is a simple full adder/subtracter and a one-bit multiplier. The inputs to ALU 14 are from the WR's 13. These ALUs carry out whatever instruction is specified by the control unit of SVP 10. A feature of SVP 10 is that each ALU 14 executes instructions from a set of instructions that operate on data directly. A control unit, which feeds an instruction stream to SVP 10 has an additional set of instructions that provide basic execution control. The control unit is further described below in connection with FIG. 5.

Figure 3:
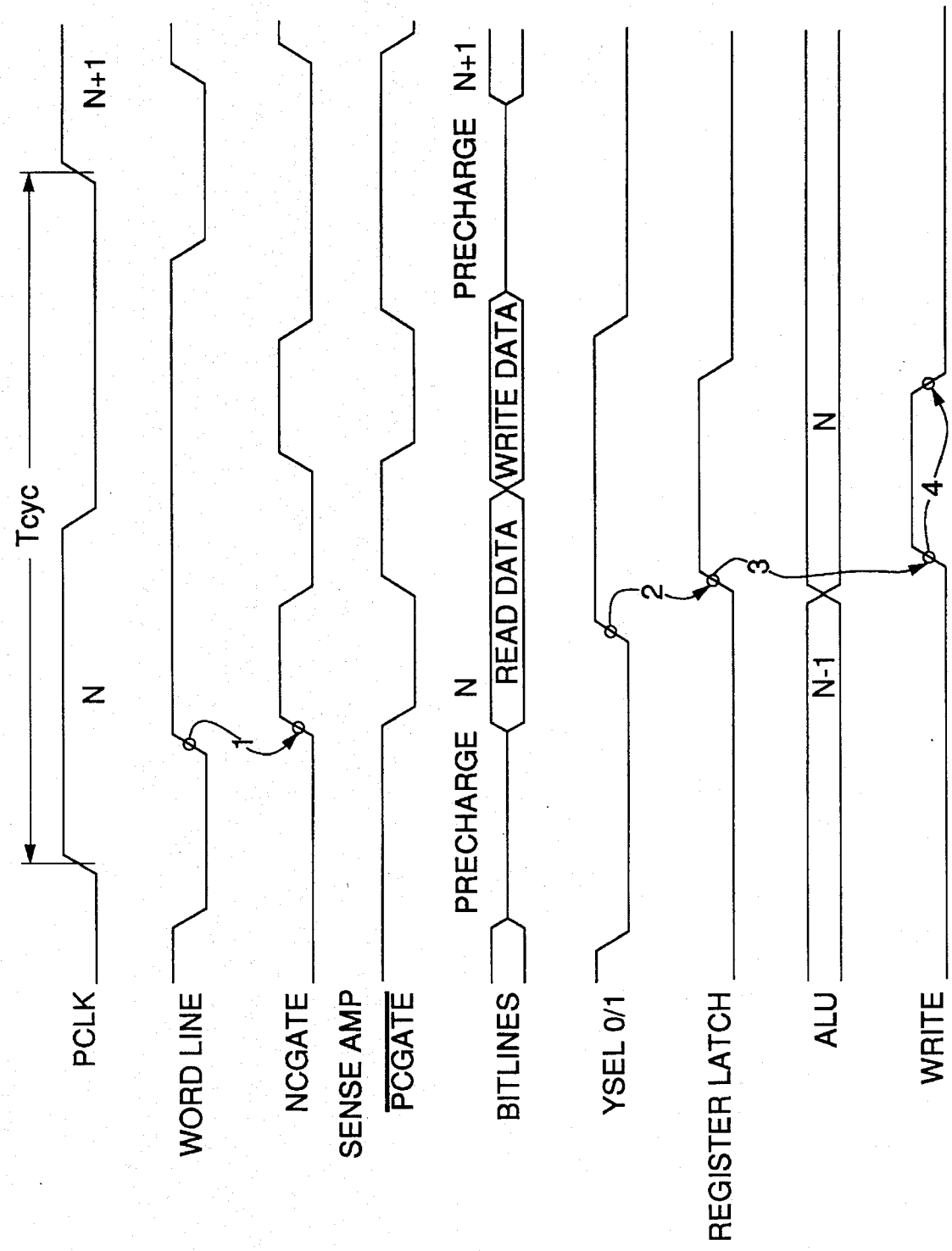
FIG. 3 is a timing diagram of one horizontal line cycle of the processor of FIG. 1.

FIG. 3 is a timing diagram of a single cycle of SVP 10. A processing clock (PCLK) is one of three clocks of SVP 10, where each clock corresponds to an input, computational, or output layer. Although the clocks are asynchronous to permit concurrent operations of these three layers, the input and output clocks stop to permit data transfers into and out of the computational layer.

In FIG. 3, one PCLK cycle, N, has a period T. The labeled timing points indicate interlocked edges, where NCGATE and PCGATE are control signals for sense amplifiers (not shown) and YSEL 0/1 indicates a select signal for R0 12 or R1 15. The sense amplifiers amplify and control the BIT-LINES for R0 12 and R1 15 transfers. To achieve single-cycle, 698-bit, parallel computations, data transfers between R0 12, R1 15, and ALU 14 are precisely timed. Each such data transfer is held off by a computation interlock circuit until the end of computation is indicated. This technique achieves a fast memory/processor data transfer rate.

Figures 4, 5:
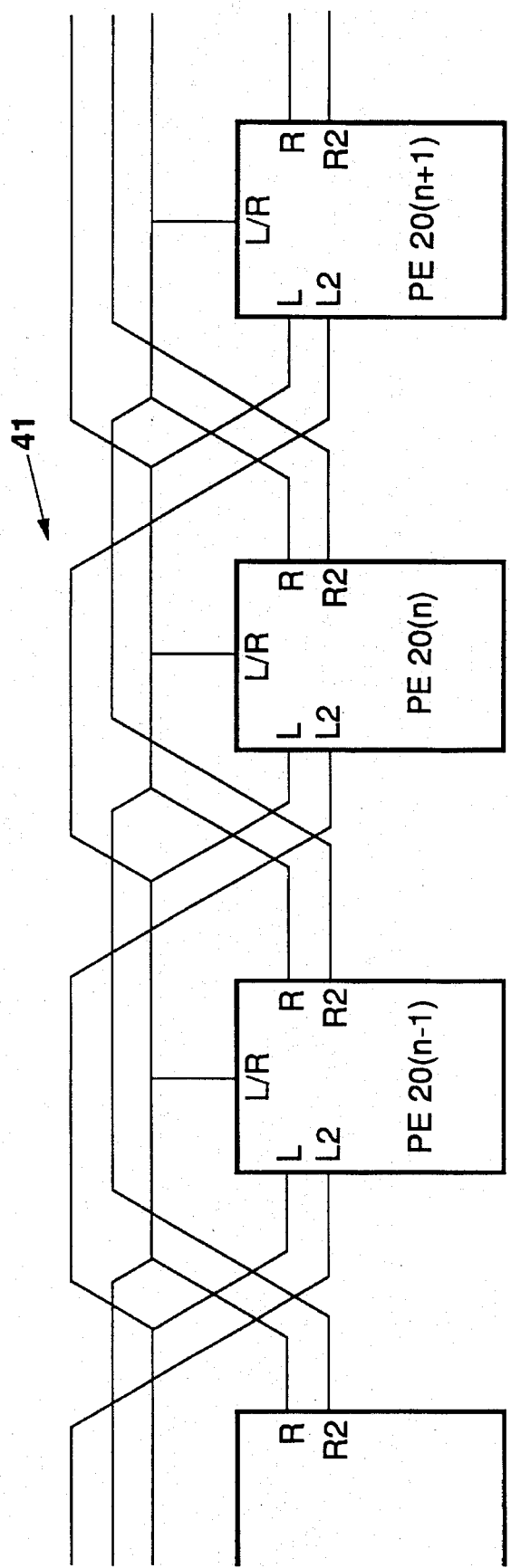
FIG. 4 illustrates near neighbor communications between the processing elements of the processor of FIG. 1.
FIG. 5 illustrates the method of determining conflict mask intersections among sub-instructions of a single source line.

FIG. 4 illustrates the near neighbor communications among PE's 20. A left/right (L/R) bus 41 provides direct memory and register read/write from each PE 20 to its four nearest neighbor PE's 20, i.e., the two PE's 20 to the left and the two PE's 20 to the right. To accomplish such communication, each PE 20 generates one output, which is fanned out to its four neighbor PE's 20. This output may be from any one of four sources: a logical 0, the contents of the B register of WR 13, or a location from either R0 12 or R1 15. Each PE 20 also receives four signals, one from each of its four nearest neighbors.

Instruction Rules

SVP 10 is programmed with micro-code sub-instructions. A source program written for SVP 10 may contain lines having a set of sub-instructions, which combine to make a single opcode when assembled. A basic concept of the invention is the use of sub-instructions in a manner that permits more than one instruction to be executed in a single clock cycle, but avoids conflicts with respect to the use of processor resources, such as memory locations.

As referred to herein, an "instruction line" is made up of an optional label, one or more sub-instructions, and an optional comment field. A valid "instruction" is made up of one or more sub-instructions, such that no sub-instruction conflicts with another. A "sub-instruction" has three parts: a destination operand, an assignment operator, and a source operand, in that order.

An example of the general form of a sub-instruction mnemonic is:

<destination operand>=<source operand> where the assembler recognizes "=" as an assignment operator.

Appendix A sets out an illustrative instruction set for SVP 10, with which the invention is useful. In Appendix A, the sub-instructions are grouped according to destination. The sub-instruction groups RF0, RF1, WRA, WRB, WRC, WRM, and ALU, represent the destinations R0 12, R1 15, WR's 13(A), 13(B), 13(C), and 13(M), and ALU 14, respectively. The groups INP and OUT represent the destinations DIR 11 and DOR 16, respectively.

The following is an illustrative list of operand names and their valid ranges, in decimal.

| | | |
|---|---|---|
| A, B, XB, C, M | | WR's 13 |
| SM, CY, KCY, BW, KCB | | outputs of ALU 14 |
| R0(n), | XR0(n), X2R0(n) | R0 12 at address n |
| | LR0(n), L2R0(n) | 0 <= n <= 127 |
| | RR0(n), R2R0(n) | |
| INP(m), | XINP(m), X2INP(m) | DIR 11 bits |
| | LINP(m), L2INP(m) | 0 <= m <= 39 |
| | RINP(m), R2INP(m) | |
| R1(p), | XR1(p), X2R1(p) | R1 15 at address p |
| | LR1(p), L2R1(p) | 0 <= p <= 127 |
| | RR1(p), R2R1(p) | |
| OUT(q), | XOUT(q), X2OUT(q) | DOR 16 bits |
| | LOUT(q), L2OUT(q) | 0 <= q <= 23 |
| | ROUT(q), R2OUT(q) | |

In the above list, the notation for each sub-instruction indicates its location. For example, in the case of INP(m) and using the example of a 40-bit wide DIR 11, 0<=m<=39. The notation may also include a near neighbor option. For example, in the case of 2LINP(m), 2L indicates the second next left adjacent PE 20. The leading K and leading X notations indicate conditional sub-instructions. The leading K indicates the conditional source is the immediate ALU 14. The leading X indicates that the conditional source is a neighbor processor.

Appendix A also describes, for each sub-instruction, a 21-bit operand code, a 22-bit opcode, and a 22-bit conflict mask. The operand code contains a repeat count, a R0 12 register address, a R1 15 register address, and an instruction mode. The opcode is similar in function and design to those typical of processor instruction sets. The conflict mask is explained in further detail below.

As stated above, more than one sub-instruction may form a single source line, to be executed in a single clock cycle. Although this enhances efficiency, it creates a potential for conflicts with respect to use of processor resources. For example, DIR 11 and R0 12 are mutually exclusive circuits, so that a source code line that refers to both will generate an error. Similarly, R1 15 and DOR 16 are mutually exclusive and an attempt to refer to both in the same source code line is a conflict.

The following set of rules illustrate situations in which such conflicts may arise and rules for avoiding them. The rules refer to permissible situations within a single instruction line:

1. A source operand may be specified more than once. Examples:

| B = A, C = A | legal |
|---|---|

2. A destination operand may be specified only once. Examples:

| B = A, C = B | legal |
|---|---|
| C = A, C = B | not legal |

3. Each register file may be specified more than once as a source operand if the address is the same for each sub-instruction. Examples:

| A = R0(13), B = R0(13) | legal |
|---|---|
| A = R0(13), B = R0(100) | not legal |
| A = R0(13), B = R1(100) | legal |

4. R0 12, R1 15, DIR 11, and DOR 16 may be specified as a destination operand only once. Examples:

| R0(13) = A, R1(13) = B | legal |
|---|---|
| R0(13) = A, R0(13) = B | not legal |

5. If R0 12, R1, INP, or OUT is specified as a source operand and a destination operand, the source and destination address must be the same. Examples:

| B = R0(22), R0(22) = SM | legal |
|---|---|
| C = R0(22), R1(123) = C | legal |
| C = R0(22), R0(123) = C | not legal |
| B = R1(25), INP(10) = SM | legal |
| B = R0(25), INP(10) = SM | not legal |

In general, any rule set out above for register files R0 12 and R1 15 applies to the INP and OUT instructions, with the exception that the address range of "n" and "p" is 0 to 127, the address range of "m" is 0 to 39, and the address range of "q" is 0 to 23. Thus, because the following instruction:

B=R0(10), R0(10)=SM is legal, the instruction

B=INP(10), INP(10)=SM is also legal.

Referring again to Appendix A, each sub-instruction is associated with a 22-bit conflict mask. These conflict masks are used to detect conflicts between sub-instructions in the same line. In the following description, this detection process is performed by an assembler at assembly time as part of the creation of an object code prior to run time. However, this is not a necessary limitation of the invention and depending on the application, conflicts can be detected at any time prior to actual program execution.

Also, although the invention is described in terms of an "assembler", that term is used in a broad sense to mean a utility program for converting source code mnemonics into lower level binary code. In theory, the concept of the invention could be implemented in any program for avoiding conflicts among multiple instructions executed in a single clock cycle, once the instructions are in binary form. The preferred embodiment of an assembly time implementation is described herein.

To determine if a conflict exists, an assembler calculates the logical AND of each pair of conflict masks in accordance with the table of FIG. 5. More specifically, the assembler calculates the mask code AND operation between each pair of conflict masks for all combinations of sub-instructions on the same source code line. SI(n) refers to sub-instruction (n), where n=1 . . . 7. The result of each AND operation is referred to herein as the "conflict mask intersection".

As an example, assume the following source line having four sub-instructions with no conflicts:

A=R1(5), B=R0(7), C=0, M=1

The conflict masks, in octal, for these instructions are

| A = R1(5) | 00700040 |
|---|---|
| B = R0(7) | 00070004 |
| C = 0 | 00007000 |
| M = 1 | 07000000 |

It is easily determined by inspection that no conflicts exist when the masks are AND'd. In other words, the conflict mask intersection is zero.

A second illustrative source line, having two conflicting sub-instructions is:

R1=C, R1=SM

The octal conflict masks for these instructions are:

| R1 = C | 00000070 |
|---|---|
| R1 = SM | 00000070 | which results in a non-zero conflict mask intersection.

FIG. 6 illustrates an additional feature of the invention. After performing the AND operations, the assembler determines what sort of conflict exists, by performing a series of tests. In FIG. 6, the parentheses indicate that the octal digit of interest is expanded into binary. Thus, xxx's outside the parentheses represent octal numbers, and xxx's inside the parentheses represent binary numbers. The notation "H" means that one or more bits are non-zero, and "SS" means any non-zero combination of 01, 10, or 11.

Depending on the nature of the conflict, the method generates an appropriate conflict signal. The test outputs are WRN for warning, NC for no conflict, or ERR for error. CIF is a conditional instruction flag, explained below in connection with Test 2. These signals are communicated to the "user", which may be the programmer or further programming for resolving conflicts.

In Test 1, for each AND operation of FIG. 5, if conflict mask intersection is zero, then no conflict exists between the sub-instructions. The assembler continues with the next pair of mask codes. However, if any bits of the conflict mask intersection are non-zero, the assembler performs Test 2.

In Test 2, the assembler determines if there is a conflict between requests for the conditional instruction flag. If bit 21 is set in the conflict mask intersection, bit 21 of the corresponding opcodes are XOR'd together. If the result is zero, the assembler issues a warning that more than one path is being controlled by the state of WR 13(M). If the result is non-zero, an error exists in that requests for the conditional instruction flag are conflicting.

In Test 3, the assembler looks for any bits set within an octal digit of the conflict mask intersection indicating that two different sub-instructions will attempt to specify the source data for a single register. If an octal digit is non-zero, the assembler generates an error message.

In Test 4, the assembler ensures that references to upper memory are either all to DIR 11, R0 12, or R1 15. This test also determines whether all specified addresses are the same in accordance with the conflict rules described above.

In Test 5, the assembler ensures that references to lower memory are either all to R0 12, R1 15, or DOR 16. This test also determines whether all specified addresses are the same in accordance with the conflict rules described above.

In Test 6, the assembler checks that source data for upper or lower memory or both, are specified only once. This test is in accordance with the conflict rules described above.

Figure 7:
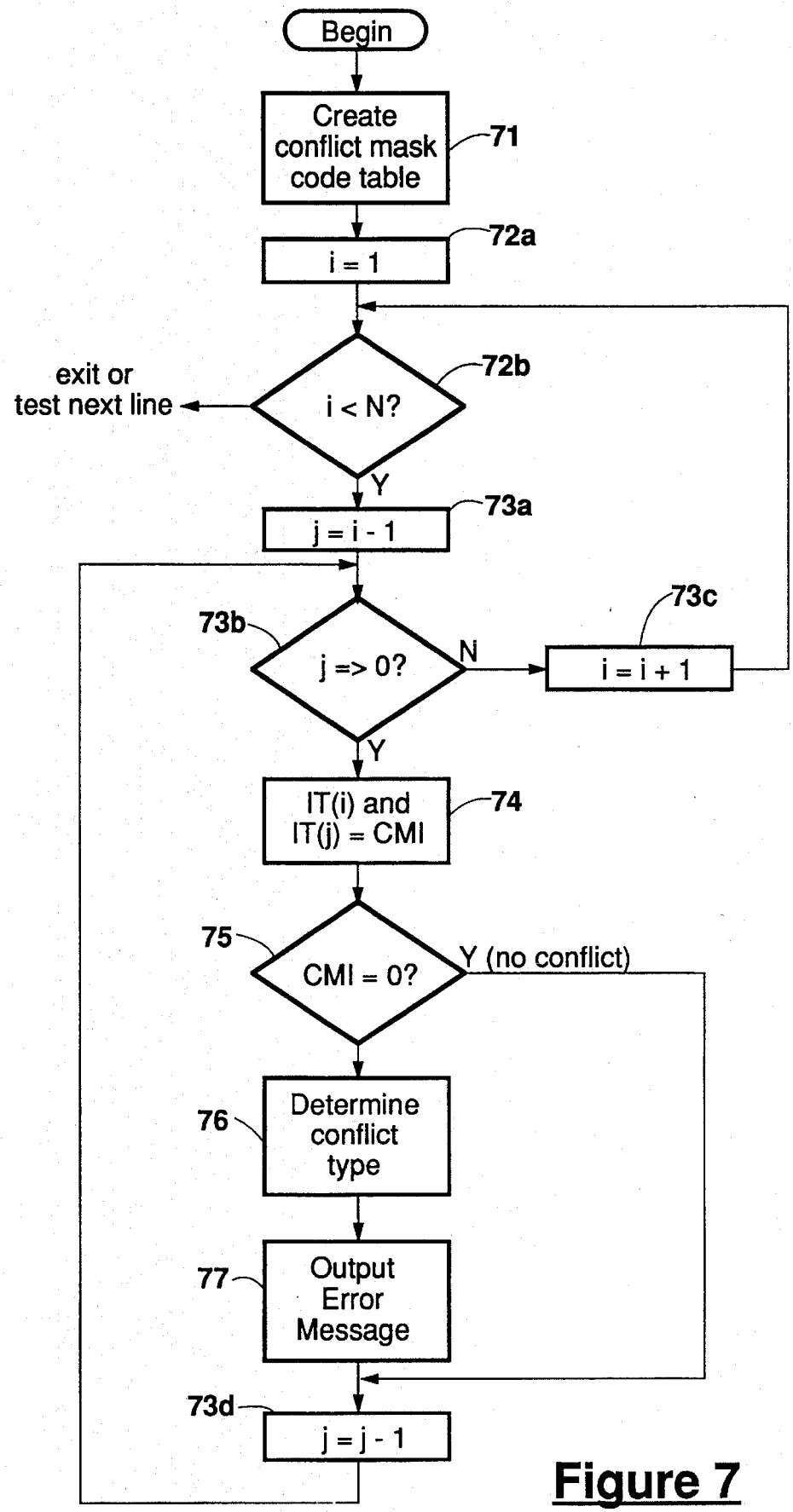
FIG. 7 is a flowchart of the steps of FIGS. 5 and 6.

Referring to FIG. 7, conflict testing tasks described above are illustrated in flowchart form. In general, steps 71–77 are performed on one line of a program source code and are repeated for each line. In FIG. 7, N represents the number of sub-instructions in the source line being tested, i.e., the line under test.

Step 71 is creating a table for use by the assembler, of the conflict mask codes for each sub-instruction of the line under test. This table has the following form:

IT(0) conflict mask code of sub-instruction SI(0) . . . IT(n) conflict mask on sub-instruction SI(n)

where SI(0) . . . SI(n) represent n sub-instructions on a single line.

Steps 72a and 72b are counter steps to determine whether all sub-instructions from the conflict mask table have been tested. If so, the next line may be tested or the test program may be exited.

Steps 73a–73b are additional control tests for supplying the test routine with a pair of mask codes from the mask code table.

Step 74 performs the AND operation to obtain the conflict mask intersection (CMI). Step 75 is determining whether CMI is zero or non-zero. If the result of step 75 is zero, no conflict exists, and the next pair of instructions is tested. Step 76 is performed if the result of step 75 is non-zero, and is determining the type of conflict. Step 76 may include the various Tests 1–6 described above. Step 77 is outputting an error message for the benefit of a user.

Processor System for Executing Sub-instructions

Figure 8:
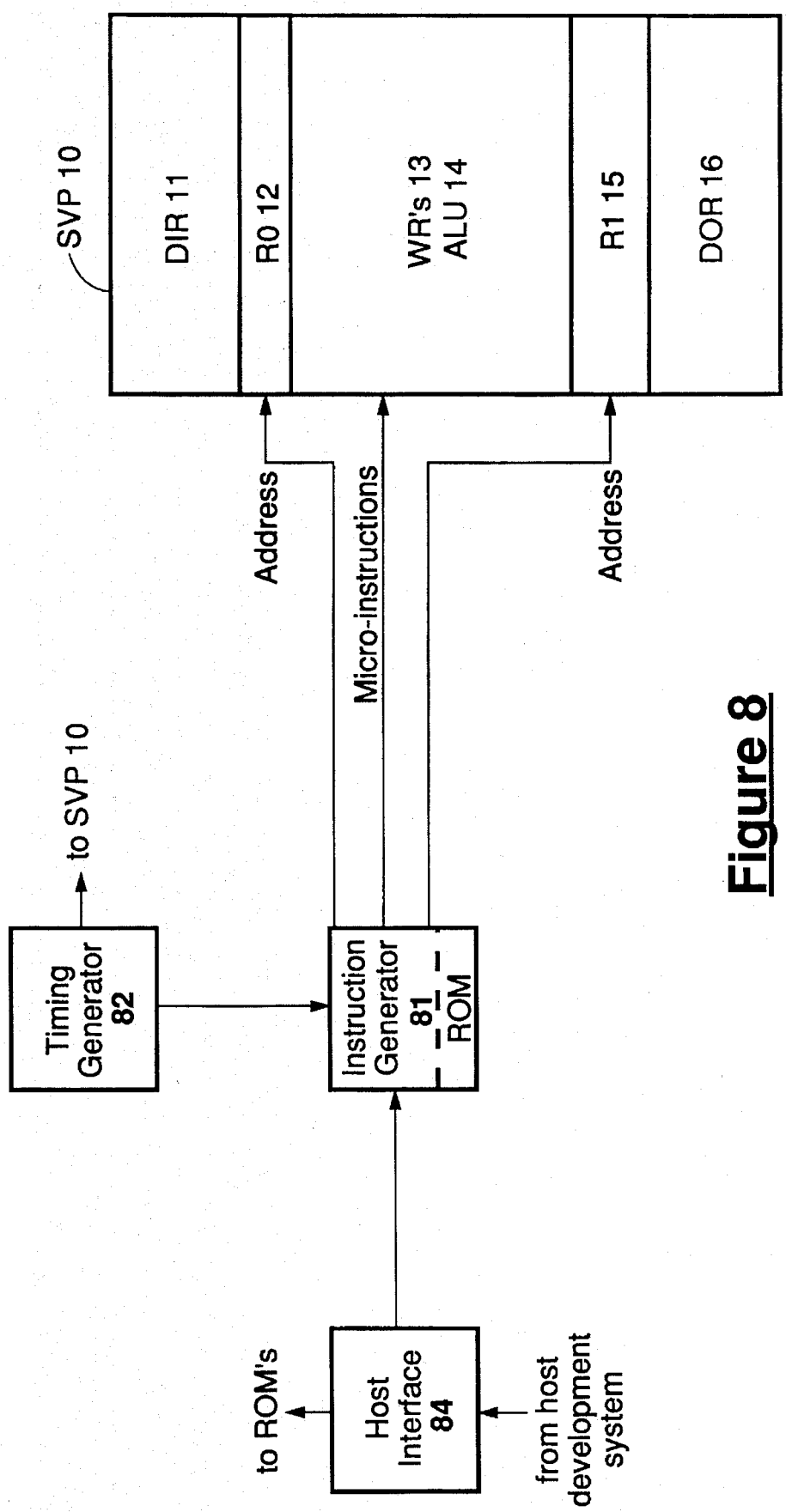
FIG. 8 is a block diagram of a single-instruction multiple-data processor, together with related components for executing sub-instructions assembled in accordance with the invention.

FIG. 8 is a block diagram of a single-instruction multiple-data processor, such as SVP 10, used with the instruction set described above. Although the invention is not limited to use with single-instruction multiple-data processors, it is particularly useful with such processors because of the need to direct data among processing elements. The invention could also be used with a single-instruction single-data processor having source and destination components amenable to concurrent data transfers.

The basic components of the processing system of FIG. 8 are SVP 10, an instruction generator 81, a timing generator 82, and host interface 84.

Instruction generator 81 provides micro-instructions and addresses to SVP 10 from an associated memory, shown in FIG. 8 as a read only memory (ROM). To facilitate software development, the ROM associated with instruction generator 81 may be changed for a random access memory (RAM). Programs may be developed on a host system (not shown) and downloaded to the RAM, via host interface 84, using standard interface techniques. Host interface 84 may be used for parallel or serial data transfers, for example, an RS-232C interface.

Timing generator 82 provides timing signals, such as those described above in connection with FIGS. 1–4. Among the timing signals generated by timing generator 82 are the processor clock, during which a number of sub-instructions may be executed.

Other Embodiments

Although the invention has been described with reference to specific embodiments, this description is not meant to be construed in a limiting sense. Various modifications of the disclosed embodiments, as well as alternative embodiments will be apparent to persons skilled in the art. It is, therefore, contemplated that the appended claims will cover all modifications that fall within the true scope of the invention.

```
                    | | | |
                    | | | |    22-bit      22-bit
        Mnemonic    R R R C    Op-Code     Con-mask    Operation
                    C 1 0 M
                    _ _ _ _
RF0 Sub-instructions:

R0(n) = R0(n)     x x n x  00000000     00000007    NO-OP or read RF0(n)
  INP(m) = INP(m)   x x m x  00000004     00000007    NO-OP or read DIR(m)

R0(n) = C         x x n x  00000001     10000007    (WRC) into RF0(n)
  R0(n) = SM        x x n x  00000002     00000007    ALU Sum into RF0(n)
  R0(n) = M         x x n x  00000003     00000007    (WRM) into RF0(n)
  INP(m) = C        x x m x  00000005     10000007    (WRC) into DIR(m)
  INP(m) = SM       x x m x  00000006     00000007    ALU Sum into DIR(m)
  INP(m) = M        x x m x  00000007     00000007    (WRM) into DIR(m)
  R0(n) = 0         x x n x  10000001     10000307    Logical 0 into RF0(n)
  INP(m) = 0        x x m x  10000005     10000307    Logical 0 into DIR(m)

R0(n) = XR0(n)    x x n x  10000101     10000707
       = RR0(n)     ; (WRM)=0                         Right RF0(n) into RF0(n)
       = LR0(n)     ; (WRM)=1                         Left RF0(n) into RF0(n)

INP(m) = XINP(m)  x x m x  10000105     10000707
       = RINP(m)    ; (WRM)=0                         Right DIR(m) into DIR(m)
       = LINP(m)    ; (WRM)=1                         Left DIR(m) into DIR(m)

R0(n) = XR1(p)    x p n x  10000201     10000707
       = RR1(p)     ; (WRM)=0                         Right RF1(p) into RF0(n)
       = LR1(p)     ; (WRM)=1                         Left RF1(p) into RF0(n)

R0(n) = XOUT(q)   x q n x  10000241     10000707
       = ROUT(q)    ; (WRM)=0                         Right DOR(q) into RF0(n)
       = LOUT(q)    ; (WRM)=1                         Left DOR(q) into RF0(n)

INP(m) = XR1(p)   x p m x  10000205     10000707
       = RR1(p)     ; (WRM)=0                         Right RF1(p) into DIR(m)
       = LR1(p)     ; (WRM)=1                         Left RF1(p) into DIR(m)

INP(m) = XOUT(q)  x q m x  10000245     10000707
       = ROUT(q)    ; (WRM)=0                         Right DOR(q) into DIR(m)
       = LOUT(q)    ; (WRM)=1                         Left DOR(q) into DIR(m)

R0(n) = XB        x x n x  10000301     10000707
       = RB         ; (WRM)=0                         Right (WRB) into RF0(n)
       = LB         ; (WRM)=1                         Left (WRB) into RF0(n)

INP(m) = XB       x x m x  10000305     10000707
       = RB         ; (WRM)=0                         Right (WRB) into DIR(m)
       = LB         ; (WRM)=1                         Left (WRB) into DIR(m)

R0(n) = X2R0(n)   x x n x  10000501     10000707
       = R2R0(n)    ; (WRM)=0                         2nd Right RF0(n) into RF0(n)
       = L2R0(n)    ; (WRM)=1                         2nd Left RF0(n) into RF0(n)

INP(m) = X2INP(m) x x m x  10000505     10000707
       = R2INP(m)   ; (WRM)=0                         2nd Right DIR(m) into DIR(m)
       = L2INP(m)   ; (WRM)=1                         2nd Left DIR(m) into DIR(m)

R0(n) = X2R1(p)   x p n x  10000601     10000707
       = R2R1(p)    ; (WRM)=0                         2nd Right RF1(p) into RF0(n)
       = L2R1(p)    ; (WRM)=1                         2nd Left RF1(p) into RF0(n)
```

```
 .emonic
<DEST> = <SRC>    | Operand / Opcode  | Con-mask  |    Operation

R0(n)  = X2OUT(q)   x q n x 10000641    10000707
        = R2OUT(q)   ; (WRM)=0                       2nd Right DOR(q) into RF0(n)
        = L2OUT(q)   ; (WRM)=1                       2nd Left DOR(q) into RF0(n)

INP(m) = X2R1(p)    x p m x 10000605    10000707
        = R2R1(p)    ; (WRM)=0                       2nd Right RF1(p) into DIR(m)
        = L2R1(p)    ; (WRM)=1                       2nd Left RF1(p) into DIR(m)

INP(m) = X2OUT(q)   x q m x 10000645    10000707
        = R2OUT(q)   ; (WRM)=0                       2nd Right DOR(q) into DIR(m)
        = L2OUT(q)   ; (WRM)=1                       2nd Left DOR(q) into DIR(m)

R0(n)  = X2B        x x n x 10000701    10000707
        = R2B        ; (WRM)=0                       2nd Right (WRB) into RF0(n)
        = L2B        ; (WRM)=1                       2nd Left (WRB) into RF0(n)

INP(m) = X2B        x x m x 10000705    10000707
        = R2B        ; (WRM)=0                       2nd Right (WRB) into DIR(m)
        = L2B        ; (WRM)=1                       2nd Left (WRB) into DIR(m)

RF1 Sub-instructions:

R1(p)  = R1(p)      x p x x 00000000    00000070    NO-OP or read(p)
 OUT(q) = OUT(q)     x q x x 00000040    00000070    NO-OP or read DOR(q)

R1(p)  = C          x p x x 00000010    00000070    (WRC) into RF1(p)
 R1(p)  = SM         x p x x 00000020    00000070    ALU Sum into RF1(p)
 R1(p)  = CY         x p x x 00000030    10000070    ALU Carry into RF1(p)
 OUT(q) = C          x q x x 00000050    00000070    (WRC) into DOR(q)
 OUT(q) = SM         x q x x 00000060    00000070    ALU Sum into DOR(q)
 OUT(q) = CY         x q x x 00000070    10000070    ALU Carry into DOR(q)

R1(p)  = KCY        x p x x 10000030    10000070    Conditional CY Write
        = R1(p)      ; (WRM)=0                       NO-OP or read RF1(p)
        = CY         ; (WRM)=1                       ALU Carry into RF1(p)

OUT(q) = KCY        x q x x 10000070    10000070    Conditional CY Write
        = OUT(q)     ; (WRM)=0                       NO-OP or read DOR(q)
        = CY         ; (WRM)=1                       ALU Carry into DOR(q)
```

APPENDIX A

| Mnemonic <DEST> = <SRC> | Operand / Opcode | Con-mask | Operation |
|---|---|---|---|
| WRA Sub-instructions: | | | |
| A = 0       | x x x x 00600000 | 00700000 | Logical 0 into WRA |
| A = 1       | x x x x 00700000 | 00700000 | (WRB) into WRA |
| A = A       | x x x x 00000000 | 00700000 | NO-OP |
| A = C       | x x x x 00500000 | 00700000 | (WRC) into WRA |
| A = R0(n)   | x x n x 00100000 | 00700004 | RF0(n) into WRA |
| A = INP(m)  | x x m x 00100004 | 00700004 | DIR(m) into WRA |
| A = R1(p)   | x p x x 00200000 | 00700040 | RF1(p) into WRA |
| A = OUT(q)  | x q x x 00200040 | 00700040 | DOR(q) into WRA |
| A = LR0(n)  | x x n x 00400100 | 00700704 | Left RF0(n) into WRA |
| A = LINP(m) | x x m x 00400104 | 00700704 | Left DIR(m) into WRA |
| A = LR1(p)  | x p x x 00400200 | 00700740 | Left RF1(p) into WRA |
| A = LOUT(q) | x q x x 00400240 | 00700740 | Left DOR(q) into WRA |
| A = LB      | x x x x 00400300 | 00700700 | Left (WRB) into WRA |
| A = L2R0(n) | x x x x 00400500 | 00700704 | 2nd Left RF0(n) into WRA |
| A = L2INP(m)| x x m x 00400504 | 00700704 | 2nd Left DIR(m) into WRA |
| A = L2R1(p) | x p x x 00400600 | 00700740 | 2nd Left RF1(p) into WRA |
| A = L2OUT(q)| x q x x 00400640 | 00700740 | 2nd Left DOR(q) into WRA |
| A = L2B     | x x x x 00400700 | 00700700 | 2nd Left (WRB) into WRA |
| A = RR0(n)  | x x n x 00300100 | 00700704 | Right RF0(n) into WRA |
| A = RINP(m) | x x m x 00300104 | 00700704 | Right DIR(m) into WRA |
| A = RR1(p)  | x p x x 00300200 | 00700740 | Right RF1(p) into WRA |
| A = ROUT(q) | x q x x 00300240 | 00700740 | Right DOR(q) into WRA |
| A = RB      | x x x x 00300300 | 00700700 | Right (WRB) into WRA |
| A = R2R0(n) | x x n x 00300500 | 00700704 | 2nd Right RF0(n) into WRA |
| A = R2INP(m)| x x m x 00300504 | 00700704 | 2nd Right DIR(m) into WRA |
| A = R2R1(p) | x p x x 00300600 | 00700740 | 2nd Right RF1(p) into WRA |
| A = R2OUT(q)| x q x x 00300640 | 00700740 | 2nd Right DOR(q) into WRA |
| A = R2B     | x x x x 00300700 | 00700700 | 2nd Right (WRB) into WRA |

APPENDIX A

```
 mnemonic
<DEST> = <SRC>     | Operand / Opcode     | Con-mask  |    Operation
------------------------------------------------------------------------
WRB Sub-instructions:

B = 0          x x x x 00060000        00070000   Logical 0 into WRB
    B = 1          x x x x 00070000        00070000   WRA into WRB
    B = B          x x x x 00000000        00070000   NO-OP
    B = C          x x x x 00050000        00070000   (WRC) into WRB B = R0(n)      x x n x 00010000        00070004   RF0(n) into WRB
    B = INP(m)     x x m x 00010004        00070004   DIR(m) into WRB
    B = R1(p)      x p x x 00020000        00070040   RF1(p) into WRB
    B = OUT(q)     x q x x 00020040        00070040   RF OUT(q) into WRB B = LR0(n)     x x n x 00040100        00070704   Left RF0(n) into WRB
    B = LINP(m)    x x m x 00040104        00070704   Left DIR(m) into WRB
    B = LR1(p)     x p x x 00040200        00070740   Left RF1(p) into WRB
    B = LOUT(q)    x q x x 00040240        00070740   Left DOR(q) into WRB
    B = LB         x x x x 00040300        00070700   Left (WRB) into WRB B = L2R0(n)    x x n x 00040500        00070704   2nd Left RF0(n) into WRB
    B = L2INP(m)   x x m x 00040504        00070704   2nd Left DIR(m) into WRB
    B = L2R1(p)    x p x x 00040600        00070740   2nd Left RF1(p) into WRB
    B = L2OUT(q)   x q x x 00040640        00070740   2nd Left DOR(q) into WRB
    B = L2B        x x x x 00040700        00070700   2nd Left (WRB) into WRB B = RR0(n)     x x n x 00030100        00070704   Right RF0(n) into WRB
    B = RINP(m)    x x m x 00030104        00070704   Right DIR(m) into WRB
    B = RR1(p)     x p x x 00030200        00070740   Right RF1(p) into WRB
    B = ROUT(q)    x q x x 00030240        00070740   Right DOR(q) into WRB
    B = RB         x x x x 00030300        00070700   Right (WRB) into WRB B = R2R0(n)    x x n x 00030500        00070704   2nd Right RF0(n) into WRB
    B = R2INP(m)   x x m x 00030504        00070704   2nd Right DIR(m) into WRB
    B = R2R1(p)    x p x x 00030600        00070740   2nd Right RF1(p) into WRB
    B = R2OUT(q)   x q x x 00030640        00070740   2nd Right DOR(q) into WRB
    B = R2B        x x x x 00030700        00070700   2nd Right (WRB) into WRB
```

APPENDIX A
Page 4 of 7

| mnemonic <DEST> = <SRC> | Operand / Opcode | Con-mask | Operation |
|---|---|---|---|
| WRC Sub-instructions: | | | |
| C = 0 | x x x x 00006000 | 00007000 | Logical 0 into WRC |
| C = 1 | x x x x 00007000 | 00007000 | Logical 1 into WRC |
| C = A | x x x x 00003000 | 00007000 | WRA into WRC |
| C = C | x x x x 00000000 | 00007000 | NO-OP |
| C = CY | x x x x 00004000 | 10007000 | ALU Carry into WRC |
| C = BW | x x x x 00005000 | 00007000 | ALU Borrow into WRC |
| C = RF0(n) | x x n x 00001000 | 00007004 | (WRB) into WRC |
| C = INP(m) | x x m x 00001004 | 00007004 | DIR(m) into WRC |
| C = R1(p) | x p x x 00002000 | 00007040 | RF1(p) into WRC |
| C = OUT(q) | x q x x 00002040 | 00007040 | DOR(q) into WRC |
| R0(n) = C | x x n x 00000001 | 10000007 | (WRC) into RF0(n) |
| INP(m) = C | x x m x 00000005 | 10000007 | (WRC) into DIR(m) |
| R1(p) = C | x p x x 00000010 | 00000070 | (WRC) into RF1(p) |
| OUT(q) = C | x q x x 00000050 | 00000070 | (WRC) into DOR(q) |
| C = KCB | x x x x 10004000 | 10007000 | Conditional CY/BW |
| = BW | ; (WRM)=0 | | ALU Carry into WRC |
| = CY | ; (WRM)=1 | | ALU Borrow into WRC |

APPENDIX A

```
       Mnemonic
<C  T> = <SRC>        | Operand / Opcode      | Con-mask  |       Operation
_____
WRM Sub-instructions:

M = 0            x x x x 06000000       07000000    Logical 0 into WRM
       M = 1            x x x x 07000000       07000000    Logical 1 into WRM
       M = C            x x x x 05000000       07000000    (WRC) into WRM
       M = M            x x x x 00000000       07000000    NO-OP
       M = AUXi(j)      x k x x 06000040       07000070    AUX REG i bit j into WRM
                        ; k = i*4 + j + 64,  0 <= i <= 7,  0<= j <= 3

M = R0(n)        x x n x 01000000       07000004    RF0(n) into WRM
       M = INP(m)       x x m x 01000004       07000004    DIR(m) into WRM
       M = R1(p)        x p x x 02000000       07000040    RF1(p) into WRM
       M = OUT(q)       x q x x 02000040       07000040    DOR(q) into WRM M = LR0(n)       x x n x 04000100       07000704    Left RF0(n) into WRM
       M = LINP(m)      x x m x 04000104       07000704    Left DIR(m) into WRM
       M = LR1(p)       x p x x 04000200       07000740    Left RF1(p) into WRM
       M = LOUT(q)      x q x x 04000240       07000740    Left DOR(q) into WRM
       M = LB           x x x x 04000300       07000700    Left (WRB) into WRM M = L2R0(n)      x x n x 04000500       07000704    2nd Left RF0(n) into WRM
       M = L2INP(m)     x x m x 04000504       07000704    2nd Left DIR(m) into WRM
       M = L2R1(p)      x p x x 04000600       07000740    2nd Left RF1(p) into WRM
       M = L2OUT(q)     x q x x 04000640       07000740    2nd Left DOR(q) into WRM
       M = L2B          x x x x 04000700       07000700    2nd Left (WRB) into WRM M = RR0(n)       x x n x 03000100       07000704    Right RF0(n) into WRM
       M = RINP(m)      x x m x 03000104       07000704    Right DIR(m) into WRM
       M = RR1(p)       x p x x 03000200       07000740    Right RF1(p) into WRM
       M = ROUT(q)      x q x x 03000240       07000740    Right DOR(q) into WRM
       M = RB           x x x x 03000300       07000700    Right (WRB) into WRM M = R2R0(n)      x x n x 03000500       07000704    2nd Right RF0(n) into WRM
       M = R2INP(m)     x x m x 03000504       07000704    2nd Right DIR(m) into WRM
       M = R2R1(p)      x p x x 03000600       07000740    2nd Right RF1(p) into WRM
       M = R2OUT(q)     x q x x 03000640       07000740    2nd Right DOR(q) into WRM
       M = R2B          x x x x 03000700       07000700    2nd Right (WRB) into WRM R0(n) = M             x x n x 00000003       00000007    WR(WRM) into RF0(n)
  INP(m) = M            x x m x 00000007       00000007    WR(WRM) into DIR(m)
```

APPENDIX A

| Mnemonic <DT> = <SRC> | Operand / Opcode | Con-mask | Operation |
|---|---|---|---|
| ALU Sub-instructions: | | | |
| R0(n) = SM | x x n x 00000002 | 00000007 | ALU Sum into RF0(n) |
| INP(m) = SM | x x m x 00000006 | 00000007 | ALU Sum into DIR(m) |
| R1(p) = SM | x p x x 00000020 | 00000070 | ALU Sum into RF1(p) |
| OUT(q) = SM | x q x x 00000060 | 00000070 | ALU Sum into DOR(q) |
| R1(p) = CY | x p x x 00000030 | 10000070 | ALU Carry into RF1(p) |
| OUT(q) = CY | x q x x 00000070 | 10000070 | ALU Carry into DOR(q) |
| C = CY | x x x x 00004000 | 10007000 | ALU Carry into WRC |
| C = BW | x x x x 00005000 | 00007000 | ALU Borrow into WRC |
| R1(p) = KCY | x p x x 10000030 | 00000070 | |
| = R1(p) | ; (WRM)=0 | | NO-OP or read RF1(p) |
| = CY | ; (WRM)=1 | | ALU Carry into RF1(p) |
| OUT(q) = KCY | x q x x 10000070 | 00000070 | |
| = OUT(q) | ; (WRM)=0 | | NO-OP or read DOR(q) |
| = CY | ; (WRM)=1 | | ALU Carry into DOR(q) |
| C = KCB | x x x x 10004000 | 10007000 | |
| = BW | ; (WRM)=0 | | ALU Carry into WRC |
| = CY | ; (WRM)=1 | | ALU Borrow into WRC |

What is claimed is:

1. A method for detecting resource conflicts between instructions to be executed in parallel in processing units of a parallel processing device, comprising the steps of:

assigning a conflict mask representative of shared processing device/unit resources in said processing device required by each of said instructions;

comparing said conflict masks and determining whether said instructions require the same resource; and generating a signal if a resource conflict exists between the instructions such that said generating a signal occurs prior to introducing said instructions into said processing device for execution.

2. The method of claim 1, wherein said comparing step includes comparing said instructions in pair combinations for resource conflict.

3. The method of claim 1, wherein said comparing step includes (A) generating conflict mask indicators from said comparisons of conflict masks; and, (B) identifying conflict types using a table of conflict types corresponding to conflict mask indicators.

4. The method of claim 3, wherein said generating a signal step includes reporting conflict types identified in said comparing step in human readable form.

5. The method of claim 3, wherein said conflict mask indicator has fields, each representing a specific violation of one of a set of predetermined conflict rules.

6. The method of claim 3, wherein said resources in said processing device comprise a plurality of registers; said instructions include specifying destinations and sources of data corresponding to said registers; and said table of conflict types includes conflict types where common registers are specified as destinations in more than one of said instructions.

7. The method of claim 1, wherein said comparing step comprises comparing said conflict masks of said instructions by performing a logical AND operation with said masks.

8. The method of claim 7, wherein said generating step comprises generating a signal based upon detecting a non-zero result from said comparing step.

9. The method of claim 7, wherein said conflict mask comprises a series of digits, and wherein said comparing step compares said conflict masks by corresponding digits.

10. The method of claim 9, wherein said generating step generates distinct signals by detecting non-zero results from said comparing step at respective digit locations corresponding to said series of digits.

11. The method of claim 9, wherein said generating step generates distinct signals by detecting patterns of non-zero results from said comparing step.

12. The method of claim 1, wherein said instructions to be executed in parallel comprise a string, and wherein said string is executable in a single clock cycle.

13. The method of claim 1, wherein said parallel processing device comprises a single processor having multiple logic and arithmetic functions.

14. A pre-execution method for detecting conflicts in resource requirements in a parallel processing device including an instruction string that includes multiple instructions to be executed in parallel which would otherwise be encountered during execution of said string, comprising:

(A) creating a conflict mask code table of instructions to be executed in parallel prior to introducing said instructions to said parallel processing device for execution;

(F) calculating a conflict mask intersection (CMI) value equal to a logical AND of a first location in said table and a second location in said table;

(G) testing CMI and if CMI is equal to zero then recognizing no conflict;

(H) determining a conflict type using said conflict mask codes; and (I) outputting an error message for the determined conflict type.

* * * * *